United States Patent [19]

Shanahan

[11] Patent Number: 4,821,861

[45] Date of Patent: Apr. 18, 1989

[54] BULK MATERIAL CHUTE SYSTEM

[76] Inventor: Robert Shanahan, 15034 Shoreline Dr., Weed, Calif. 96094

[21] Appl. No.: 200,355

[22] Filed: May 31, 1988

[51] Int. Cl.⁴ ............................................. B65G 11/16
[52] U.S. Cl. ................................... 193/25 E; 141/93; 141/310; 414/291; 193/32
[58] Field of Search ................. 414/291; 193/17, 2 A, 193/25 R, 25 E, 32; 198/525, 534; 141/93, 310, 286

[56] References Cited

U.S. PATENT DOCUMENTS

| 2,939,614 | 6/1960 | Hill | 141/93 X |
| 3,428,156 | 2/1969 | Charyn et al. | 193/25 R |
| 3,921,351 | 11/1975 | Johnson | 222/462 X |
| 3,949,850 | 4/1976 | Schumm | 193/25 E |
| 4,061,221 | 12/1977 | Higashinaka et al. | 414/291 |
| 4,205,710 | 6/1980 | Dunicz | 141/286 X |
| 4,225,033 | 9/1980 | Fukagai et al. | 414/291 X |
| 4,492,294 | 1/1985 | Ball | 414/291 X |
| 4,557,364 | 12/1985 | Ball | 414/291 X |
| 4,727,913 | 3/1988 | Bliss | 414/291 X |

FOREIGN PATENT DOCUMENTS

| 0002953 | 1/1977 | Japan | 414/291 |
| 0051171 | 4/1979 | Japan | 414/291 |
| 0140354 | 10/1979 | Japan | 414/291 |

Primary Examiner—Robert J. Spar
Assistant Examiner—D. Glenn Dayoan
Attorney, Agent, or Firm—Bielen and Peterson

[57] ABSTRACT

A dust-preventing, vertical chute system for loading bulk materials from a conveyor, slide or other dispensing mechanism. The system including a series of interconnected, partially nestled open buckets having a venturi insert of size and configuration compatible with the material to be loaded for generating a low pressure, internal air stream resulting in external air being drawn into the bucket system during dispensing of the bulk material into a ship or the like for inhibiting escape of dust.

10 Claims, 2 Drawing Sheets

BULK MATERIAL CHUTE SYSTEM

BACKGROUND OF THE INVENTION

This invention relates to a unique bulk material loading system having means for reducing the flow of dust into the environment caused during high volume loading procedures for granulated or powdered materials. With the advent of more stringent environmental controls, certain practices for high volume loading of bulk materials have had to be curtailed. Even where the material is benign, dispersal of air borne dust results in a degredation of the environment that in many areas is no longer tolerated. The use of hooded conveyors and slides, as well as sealed pneumatic systems, has substantially increased in recent years resulting in reduced emissions from these sources. While these systems are adequate for delivering the material to the discharge point, final discharge for storage or treatment has remained a problem.

In designing a vertical discharge system where bulk material is discharged into a ship hold, a rail car, or a storage pile, etc., the system must be flexible enough to handle a wide variety of grandular materials of varying size. In high volume systems, the equipment must be simple in design, yet able to withstand substantial abuse. The bulk material handling system of this invention comprises a vertical chute formed by a series of interconnected and partially nestled, open-end buckets. The buckets include an internal contoured inset that generates a venturi effect to draw air into the flow stream to prevent external environmental discharge of airborne dust. The insets are replaceable with other insets of different configuration to adapt the bucket system to the wide variety of materials encountered in a commercial bulk loading operation.

SUMMARY OF THE INVENTION

The bulk material chute system of this invention is designed for discharge of high volumes of bulk material with minimum emission of fugitive dust particles. The transport of bulk material from the point of storage to the point of transport, or vice versa, requires that huge quantities of material, often in the tens of thousands of tons, be moved rapidly at rates that may exceed thousands of tons an hour. To accomplish this task with a minimum dispersal of fugitive dust, the conveying systems are generally enclosed. However, at the point of discharge, it is difficult to enshroud the discharge stream without losing the flexibility necessary to direct or distribute the discharge material to the specific area desired. If a vertical discharge chute is adopted, the chute must be sized in diameter and length for those specific material and unloading conditions encountered. Furthermore, the chute must be sufficiently flexible to allow the relocation of the discharge end to permit efficient distribution and stacking of material unloaded. Because the distance from the discharge opening to the discharged material must be minimized to be reduce vagrant dust, the length of the chute must also be readily changeable for different unloading conditions and distances.

While primarily designed for bulk loading into the hold of a bulk transport ship, the loading chute of this invention can be used in conjunction with any other conveyor or pneumatic transport system where it is desired to vertically discharge the material. The design of the system is rugged and utilitarian allowing substantial abuse during operation.

In order to control unwanted emissions of vagrant dust, the design of the vertical chute includes a stack of interconnected buckets. The buckets have a wide open top and a somewhat narrower open bottom, allowing the buckets to be stacked in a series with an upper bucket partially inserted in the next adjacent lower buckets. The buckets are hung on three vertical and parallel chains such that the series of buckets do not contact one another and leave an annular gap or air space between the inserted bottom rim of one bucket and the top rim of the next adjacent bucket. Each bucket includes an inset that is constructed with a central constriction to form the desired venturi effect. Since the buckets are not tightly nestled within one another, the low pressure zone created by the increased velocity feed at the constriction draws air into the bucket series through the annular air gap between the juxtaposed buckets. The vacuum effect is enhanced by air holes in the inset and adjacent wall of the bucket to provide a direct air passage to the low pressure zone just below the constriction. Thus, while the chute provides some retarding of the flow, the gradually accelerating material at the core is effectively utilized to inhibit the discharge of vagrant dust from the flow stream. The series of buckets can be assembled to any desired length, such that the end bucket is discharging the bulk material a minimum distance. These and other features will become apparent from a detailed consideration of the preferred embodiment.

DETAILED DESCRIPTION OF THE PREFERRED EMBODIMENT

Figures 1, 2:
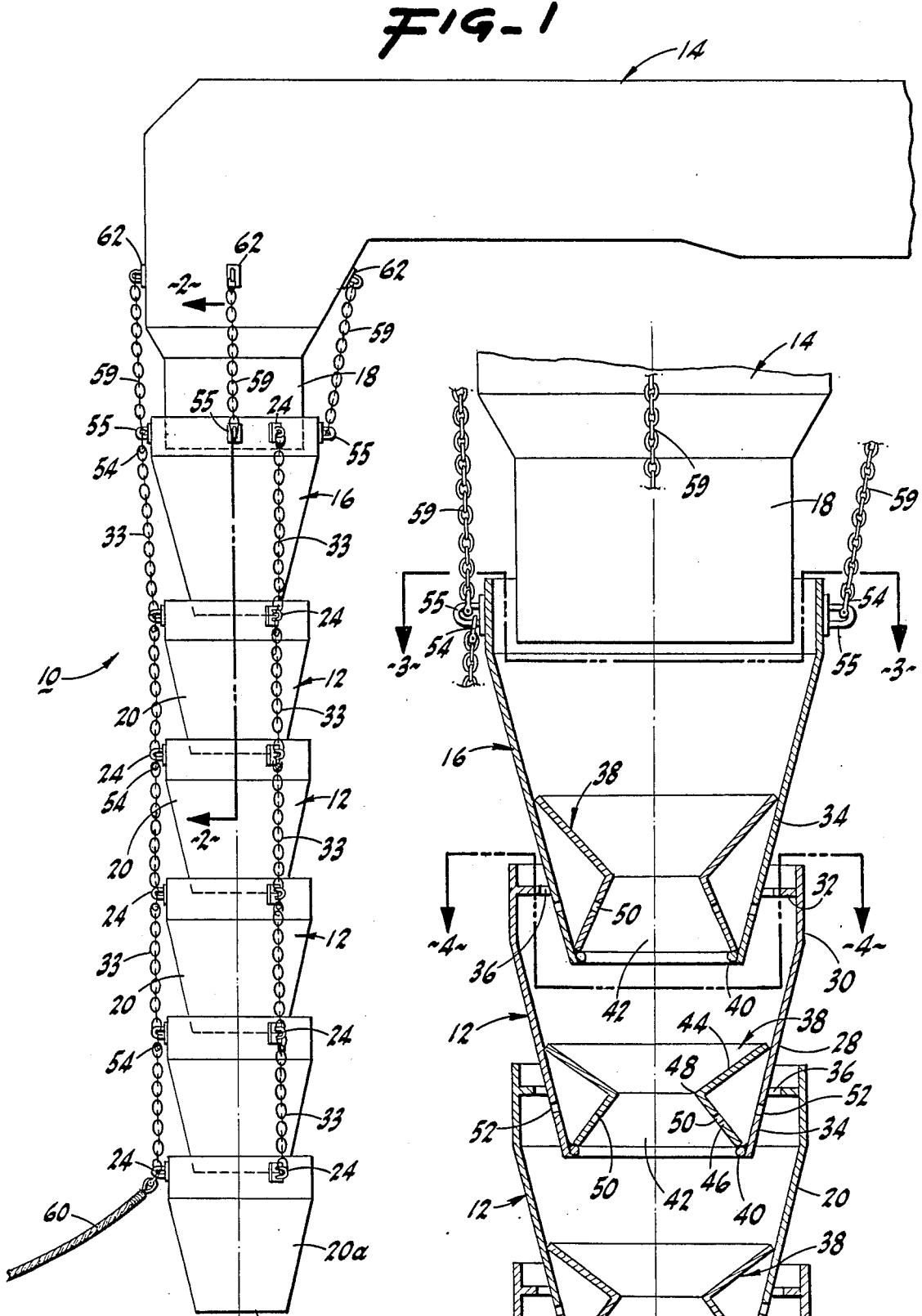
FIG. 1 is a side elevational view of the chute assembly connected to a portion of a discharge conveyor.
FIG. 2 is a cross sectional view taken along the lines 2—2 in FIG. 1.

Referring to FIG. 1 the bulk material chute system designated generally by reference numeral 10 is shown as an assembly of independent buckets 12 connected in series to a covered dispensing conveyor unit 14. It is to be understood that other dispensing or discharge systems can be employed in conjunction with the bulk material chute system 10 of this invention. The bulk material chute system is a vertical chute of the type used to unload bulk granular or powdered materials of substantial volume. The system is designed to minimize the escape of fugitive dust to the surrounding atmosphere. The system can be used for coal, other minerals, grains, powders and other materials transported in large volumes that tend to either be dusty or generate dust on being agitated during conveyance and discharge.

The buckets 12 are strong and interconnected in a stack with a master bucket 16 connected to the discharge orifice 18 of the covered conveyor system 14, and a series of slave buckets 20 hanging from the master bucket 16.

Each of the buckets 12, as shown in greater detail in the enlarged partial view of FIG. 2, are preferably fabricated from steel and are constructed with a right truncated-cone portion 28 with a top cylindrical rim portion 30. The slave buckets 20 have a flat, annular ring 32 welded to the inside of the top rim. The slave buckets 20 are nestled in a top in bottom series and are suspended from three, parallel, equally spaced chains 33 such that the annular ring 32 is maintained spaced from the outer wall 34 of the juxtaposed bucket above. The narrow annular space 36 formed, not only allows the string of buckets a limited degree of articulation, but more importantly provides an air passage for outside atmospheric air to enter the bucket system.

Figure 5:
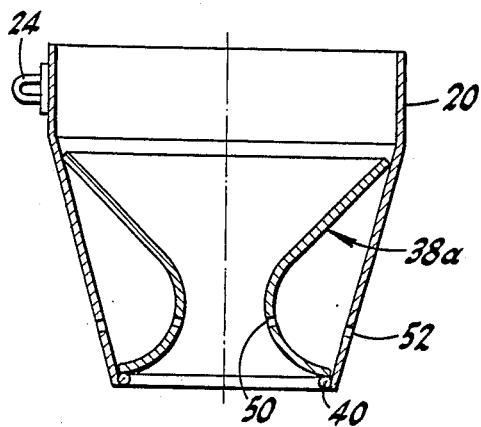
FIG. 5 is an alternate embodiment of the inset in a slave buckets.
Figure 6:
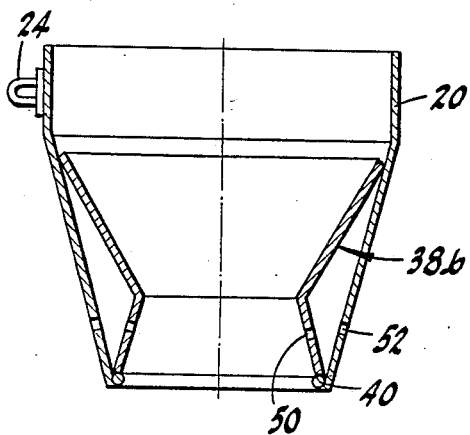
FIG. 6 is a second alternate embodiment of the inset in the slave bucket.
Figure 4:
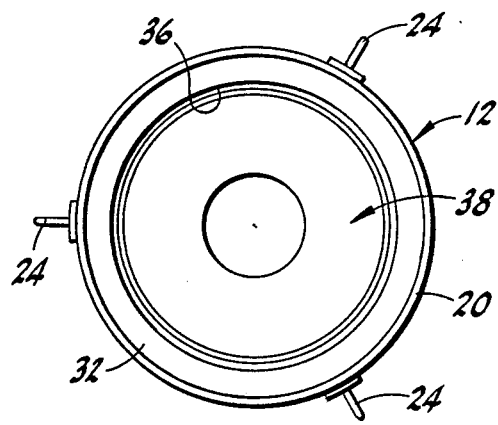
FIG. 4 is a top view of a slave bucket taken on the lines 4—4 and FIG. 1.

Entry of air into the chute system is induced by a venturi effect generated by an inset 38 that sits on a seating ring 40 at the bottom opening 42 of the buckets 12. For ease of fabrication the inset is formed of two truncated conical sections 44, and 46 joined together at their constricted ends to form a generally constricted central section 48. As shown in FIG. 5 the configuration of the inset 38a can be curved instead of angular, so long as a venturi orifice, as generally known, is formed. The inset 38 is designed to be easily removable and replaceable, for examle, with an inset 38b of different dimension as shown in FIG. 6, when flow rates or material compositions change. While inclusion of the inset 38c in the master bucket 16 is optional, since the taller height and gradual taper is useful in forming the material flow, an inset may nevertheless be included and may desirably be of larger size as shown that those in the slave buckets. The simple construction and ease of replacement is designed to allow a series of different sized insets to be provided for the chute system. Since the insets can also provide a desirable retarding effect to reduce breakage, the user can select a suitable inset for a wide variety of parameters including flow rate, material type, particle size and propensity for dust release.

Each of the insets 38 preferably includes a series of holes 50 around the lower conical portion 46 just below the construction 48 to improve air intake. A series of complementary holes 52 pass through the slave buckets 20 at approximately the same level as the holes 50 in the inset 38. The buckets are suspended such that the annular ring 32 is slightly above the level of the holes for optimum operation of the venturi effect by forming an air passage directly to the low pressure zone generated by the venturi effect. Adjustments in position and hole location can be made as such are not critical.

In operation, the flow of material through the chute system is slowed above the constriction 48 of the insets 38 and then is accelerated as the material passes through. This acceleration generates a low pressure zone that draws higher pressure atmospheric air in part in through the holes 50 and 52. Air feeding the holes is drawn through the space 36 between ring 32 and wall 34. Generated dust that circulates in the space between buckets is either drawn into the descending main flow stream, or if it rises to the top of the bucket in an attempt to escape out the space between the outer wall and the annular ring, it encounters the incoming clean air flow and is drawn back into the flow zone. Some vagrant dust may be drawn through the holes 50, 52 to reunite with the central flow stream.

Adjustment in the position of the slave buckets can be made by repositioning the clevis shackles 54 on the link chain and reattaching to the u-brackets 24 on the slave buckets.

Because of the spaced interconnection of the chained buckets, the assembled chute system 10 has a degree of articulation permitting the end orifice 58 in the last bucket 20a to be displaced by a tether 60 to control the discharge and placement of bulk material flowing through the system. Generally such a tether should be connected to one of the u-brackets 24 such that when the chute system is displaced by pulling on the tether, the series of buckets will be supported by the two back chains when the chain on the tethered u-bracket slackens. The last bucket 20a may optionally omit the venturi insert.

Figure 3:
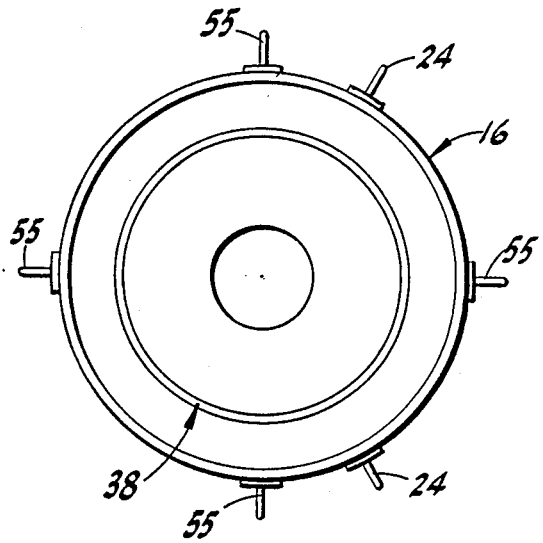
FIG. 3 is a top view of a master bucket taken along the lines 3—3 of FIG. 1.

The master bucket has four u-brackets 54 symmetrically spaced around its top rim for connection to four similarly spaced u-brackets 62 on the dispensing conveyor 14 by chains 59. As shown in FIG. 3, the two additional brackets on the master bucket 16 allow for the four and three chain connection scheme. By altering the connection scheme of the master bucket to the conveyor, for example, by rotating the bucket 180°, an appropriate orientation can be obtained to assure that at least two chains support the buckets for the particular direction that the chute system is displaced.

It is to be understood that the size and relative height of buckets can be changed without affecting the operation in any material respect. Taller slave buckets are more cost effective but reduce the articulation ability. Similarly buckets can be stacked in contact with one another with the addition of holes in the flat top ring, but articulation is substantially inhibited.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A dust-preventing, verticle chute system comprising:
    a plurality of interconnected buckets each having a wall of generally truncated conical configuration with an open top and a smaller diameter open bottom, with first means for interconnecting the buckets to an auxiliary bulk material dispensing device, and second means for interconnecting the buckets in a vertical stack with the bottom of each upper bucket partially nestled in the top of the next lower bucket, wherein the arrangement provides an air space between the nestled bottom of each upper bucket and the top of the next lower bucket; and,
    a venturi member situated in the bottom of each upper bucket the venturi member having a constricted section with an air passage means below the constricted section communicating with the air space between buckets for drawing atmospheric air into the chute system when bulk material passes through the chute system.

2. The chute system of claim 1 wherein the top of each bucket has an inside flat annular ring member which constricts the air space between buckets.

3. The chute system of claim 2 wherein the air passage means includes a series of holes in the venturi member located below the constricted section and a series of holes in the wall of the bucket proximate the bottom and located below the ring member in the next lower bucket when the buckets are assembled in the stack.

4. The chute system of claim 1 wherein the first means to interconnect the buckets to the auxiliary dispensing means comprises a master bucket with a plurality of chains adapted to connect to the dispensing device and suspend the master bucket from the dispensing device.

5. The chute system of claim 4 wherein the master bucket has an open top and an open bottom, and is suspended from the auxiliary device by four chains uniformly spaced around the top of the master bucket.

6. The chute system of claim 4 wherein the master bucket has its bottom nestled in and displaced from the top of the upper bucket in the stack of buckets such that an air space is formed between the master bucket and the upper bucket, the master bucket having a venturi member situated in the bottom of the master bucket, the venturi member having a constricted section with an air passage means below the constricted section in communication with the air space between the master bucket and the upper bucket.

7. The chute system of claim 1, wherein the second interconnecting means comprises three elongated parallel chains uniformly spaced around the stack of buckets, each chain connected to each bucket and connected to the first means for interconnecting the buckets to an auxiliary device.

8. The chute system of claim 1 wherein the venturi member is removable, the chute system including a plurality of different sized venturi members for including in the chute system according to the bulk material to be dispensed or rate of dispensing to be accomplished.

9. The chute system of claim 8 wherein the buckets have a seating ring in the inside of the bottom of the buckets on which the venturi member seats.

10. The chute system of claim 1 wherein the stack of buckets formed has a bottom bucket with a discharge orifice and the stack of buckets formed has a limited degree of articulation such that the discharge orifice can be displaced from one position to another to distribute discharge of bulk material.

* * * * *